United States Patent
Anders et al.

(10) Patent No.: US 11,958,150 B2
(45) Date of Patent: Apr. 16, 2024

(54) METHOD FOR REPAIRING A DAMAGED LEADING OR TRAILING EDGE REGION OF A METALLIC TURBINE BLADE

(71) Applicant: Siemens Energy Global GmbH & Co. KG, Bayern (DE)

(72) Inventors: Björn Anders, Berlin (DE); Reiner Anton, Berlin (DE); Constantin Garske, Birkenwerder (DE); Kay Krabiell, Hohen Neuendorf (DE); Heiko Lammers, Leipzig (DE); Ricardo Nilsson, Düsseldorf (DE); Daniel Vöhringer, Berlin (DE); Jörg Ziege, Berlin (DE)

(73) Assignee: Siemens Energy Global GmbH & Co. KG, Bayem (DE)

( * ) Notice: Subject to any disclaimer, the term of this patent is extended or adjusted under 35 U.S.C. 154(b) by 0 days.

(21) Appl. No.: 18/025,901

(22) PCT Filed: Aug. 6, 2021

(86) PCT No.: PCT/EP2021/072032
§ 371 (c)(1),
(2) Date: Mar. 12, 2023

(87) PCT Pub. No.: WO2022/063475
PCT Pub. Date: Mar. 31, 2022

(65) Prior Publication Data
US 2023/0347457 A1     Nov. 2, 2023

(30) Foreign Application Priority Data
Sep. 24, 2020   (DE) .................... 10 2020 212 006.4

(51) Int. Cl.
*B23P 6/00*     (2006.01)
*B23K 1/00*     (2006.01)
(Continued)

(52) U.S. Cl.
CPC ............ *B23P 6/005* (2013.01); *B23K 1/0018* (2013.01); *F01D 5/005* (2013.01);
(Continued)

(58) Field of Classification Search
CPC . B23P 6/005; B23K 1/0018; B23K 2101/001; F01D 5/005; B33Y 80/00; F05D 2230/80; F05D 2230/30; F05D 2230/64
See application file for complete search history.

(56) References Cited

U.S. PATENT DOCUMENTS

| | | | |
|---|---|---|---|
| 6,238,187 B1 | 5/2001 | Dulaney | |
| 7,841,834 B1 * | 11/2010 | Ryznic | F04D 29/023 416/224 |

(Continued)

FOREIGN PATENT DOCUMENTS

| | | | |
|---|---|---|---|
| CA | 2717830 A1 * | 4/2011 | ............. B22F 7/062 |
| CA | 2717830 C | 3/2016 | |

(Continued)

OTHER PUBLICATIONS

PCT International Search Report and Written Opinion of International Searching Authority dated Mar. 31, 2022 corresponding to PCT International Application No. PCT/EP2021/072032 filed Aug. 6, 2021.

*Primary Examiner* — Bayan Salone
(74) *Attorney, Agent, or Firm* — Wolter Van Dyke Davis, PLLC

(57) ABSTRACT

A method for repairing a damaged leading or trailing edge region of a metallic turbine blade, which has a suction-side blade wall, a pressure-side blade wall and a leading edge and a trailing edge, includes: removing the damaged leading or trailing edge region, with a cutout being formed; providing a replacement part which can be inserted in form-fitting fashion into the cutout and which restores the intended geometry of the turbine blade; inserting the replacement part (Continued)

in form-fitting fashion into the cutout in a predetermined insertion direction, and cohesively connecting the replacement part to the turbine blade, wherein mechanical connection of the replacement part and turbine blade using separate fastening elements is performed in addition to the cohesive connection.

9 Claims, 5 Drawing Sheets

(51) Int. Cl.
*B33Y 80/00* (2015.01)
*F01D 5/00* (2006.01)
*B23K 101/00* (2006.01)

(52) U.S. Cl.
CPC ......... *B23K 2101/001* (2018.08); *B33Y 80/00* (2014.12); *F05D 2230/80* (2013.01)

(56) References Cited

U.S. PATENT DOCUMENTS

| | | | | |
|---|---|---|---|---|
| 8,978,249 | B2 * | 3/2015 | Hovel | ..................... F01D 5/005 29/402.09 |
| 2007/0084047 | A1 * | 4/2007 | Lange | ..................... F01D 5/005 29/889.1 |
| 2011/0264413 | A1 * | 10/2011 | Stankowski | ............ B23P 6/005 703/1 |
| 2023/0133147 | A1 * | 5/2023 | Akinc | ................ C12N 15/1137 514/44 A |

FOREIGN PATENT DOCUMENTS

| | | | | |
|---|---|---|---|---|
| EP | 1231010 A1 * | 8/2002 | ............. | B23P 6/005 |
| EP | 1231010 A1 | 8/2002 | | |
| EP | 2317075 B1 | 1/2013 | | |
| WO | 2004096487 A1 | 11/2004 | | |

* cited by examiner

METHOD FOR REPAIRING A DAMAGED LEADING OR TRAILING EDGE REGION OF A METALLIC TURBINE BLADE

CROSS REFERENCE TO RELATED APPLICATIONS

This application is the US National Stage of International Application No. PCT/EP2021/072032 filed 6 Aug. 2021, and claims the benefit thereof. The International Application claims the benefit of German Application No. DE 10 2020 212 006.4 filed 24 Sep. 2020. All of the applications are incorporated by reference herein in their entirety.

FIELD OF INVENTION

The present invention concerns a method for repairing a damaged leading or trailing edge region of a metallic turbine blade, which has a suction-side blade wall, a pressure-side blade wall and a leading edge and a trailing edge, comprising the steps: a) removing the damaged leading or trailing edge region, forming a cutout; b) providing a replacement part which can be inserted by form fit into the cutout and which restores the intended geometry of the turbine blade; c) inserting the replacement part by form fit into the cutout in a predetermined insertion direction, and d) connecting the replacement part to the turbine blade by substance bonding.

BACKGROUND OF INVENTION

Turbine blades are used in turbomachines such as for example gas turbines. In principle, we distinguish between rotating moving blades and stationary guide blades, which direct a fluidic working medium onto the moving blades in a predefined direction. During operation of a gas turbine, turbine blades are exposed to severe stresses, in particular because of high thermal loads and a corrosive environment, leading to wear. For example, the trailing edges suffer from material loss which leads to a reduction in power, a deterioration in cooling or even complete failure of the turbine blade. In order to be able to maintain correct operation of the gas turbine, it is accordingly necessary to replace or repair worn turbine blades.

To repair a damaged leading or trailing edge region of a metallic turbine blade, methods are already known in which a worn region is removed by creating a cutout. Then a replacement part is provided which can be inserted by form fit in the cutout and is designed to restore the intended geometry of the damaged region. Such replacement parts are often called coupons. In a further step, the replacement part is inserted by form fit in the cutout in a predetermined insertion direction. To fix the replacement part, this is then connected to the turbine blade by substance bonding, for example using a soldering or welding process. Such a process is described for example in publication EP 2 317 075 B1.

SUMMARY OF INVENTION

Starting from this prior art, it is an object of the present invention to provide an improved method for repairing a damaged leading or trailing edge region of a metallic turbine blade.

To achieve this object, the present invention provides a method of the type cited initially which is characterized in that in step a), recesses without undercut relative to the insertion direction are formed in the blade walls, wherein the recesses of the suction-side blade wall are positioned offset to the recesses of the pressure-side blade wall when the turbine blade is viewed from the side; the replacement part provided in step b) has protrusions which in step c) are inserted by form fit in the recesses, wherein after insertion of the replacement part, the replacement part and the turbine blade have regions overlapping one another when the turbine blade is viewed from the side; and in step c), after insertion in the cutout, the replacement part is mechanically fixed to the turbine blade using fixing elements extending through the mutually overlapping regions, such that this mechanical fixing blocks removal of the replacement part from the cutout against the predetermined insertion direction.

Thanks to the recesses formed in the blade walls of the turbine blade remaining after performance of step a), and on one side the protrusions of the replacement part engaging therein and on the other the fixing elements by which the replacement part is attached to the turbine blade, in addition to the substance-bonded connection produced in step d), a mechanical connection is achieved whereby the load on the substance-bonded connection is greatly reduced. These recesses and protrusions engaging therein prevent a relative movement between the turbine blade and the replacement part in at least one, advantageously in both directions perpendicular to the insertion direction, and the fixing elements prevent a relative movement of the components against the insertion direction. As a whole, accordingly a very stable fixing of the replacement part on the turbine blade is guaranteed, which leads to an extended service life of the repaired turbine blade.

According to one embodiment of the present invention, in step a), the cutout is produced using an erosion process, in particular a vertical spark erosion process or wire spark erosion process. Such erosion processes are distinguished by a high precision of material removal.

The fixing elements are advantageously pin-like and are guided through passage openings provided in the overlapping regions, which achieves a simple technical implementation of the fixing. The passage openings may be created for example mechanically, in particular bored, after production of the cutout in step a).

Advantageously, the replacement part is made by additive manufacturing. Additive manufacturing is advantageous firstly in that the replacement part can be produced quickly and economically as required. Accordingly, there is no need to keep costly stocks of replacement parts. Secondly, with additive manufacturing, even replacement parts with very complex geometries can be produced without problem.

Preferably, the replacement part is a standard replacement part with standard dimensions, and the cutout is produced in step a) taking into account these standard dimensions. Such standardized replacement parts have the advantage that shape and dimensions need not be determined afresh for each repair process, which brings a significant saving in time and costs.

The standard replacement part may be machined before insertion in step c) so as to minimize deviations of the geometry of the standard replacement part from the geometry of the cutout. This may be necessary for example if, during operation of the turbo machine, the turbine blade has distorted slightly. For machining, advantageously a mechanical machining method is used, for example in the form of a milling and/or grinding process.

According to one embodiment of the present invention, the abutting edges of the replacement part are provided with spacer protrusions which serve to set a predetermined joint width for the substance-bonded connection. In this way, a substance-bonded connection with very high quality can be achieved.

Advantageously, the substance-bonded connection of the replacement part to the turbine blade takes place using a soldering process, in particular using a narrow-gap soldering process.

Furthermore, the present invention provides a turbine blade having a suction-side blade wall, a pressure-side blade wall, a leading edge and a trailing edge, wherein a damaged leading or trailing edge region is repaired using a method according to the invention.

BRIEF DESCRIPTION OF THE DRAWINGS

Further features and advantages of the present invention are presented in the following description of a method according to one embodiment of the present invention, with reference to the appended drawings. In the drawings.

DETAILED DESCRIPTION OF INVENTION

Figure 1:
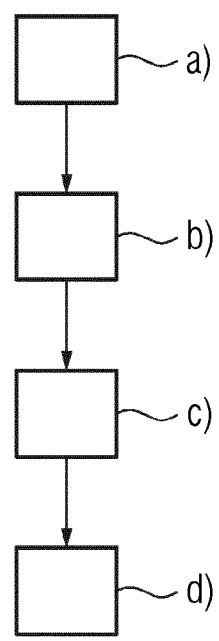
FIG. 1 shows a schematic illustration of the method steps of a method according to one embodiment of the present invention.
Figure 2:
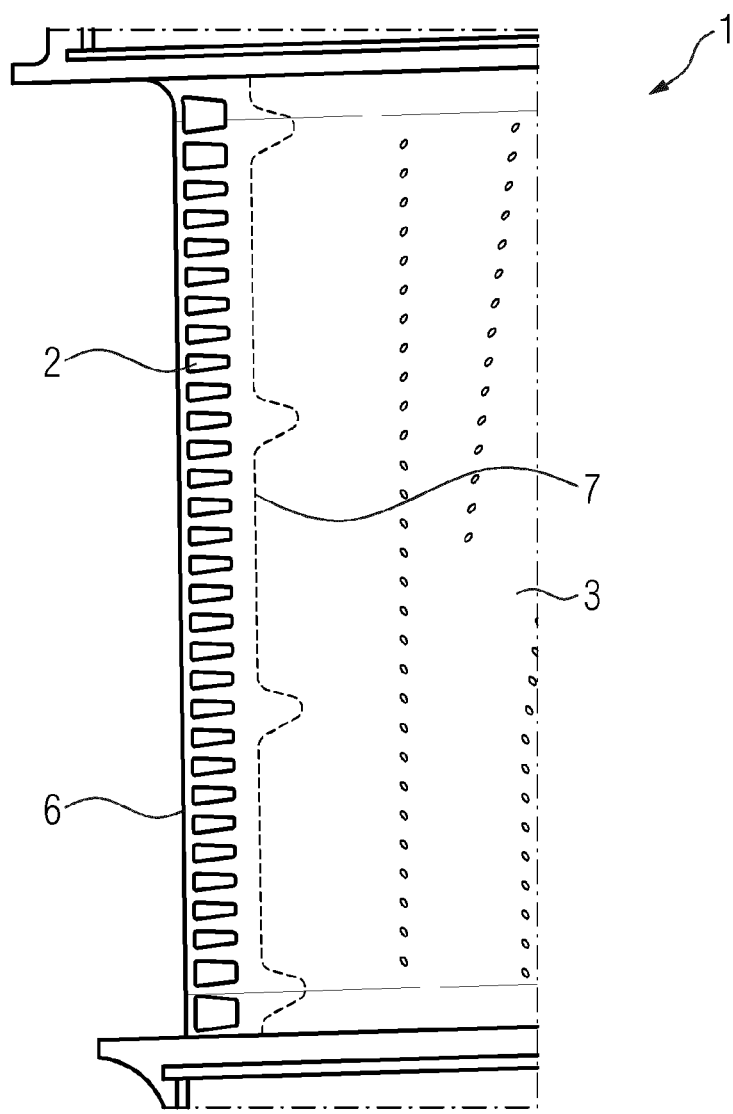
FIG. 2 shows a side view of a part region of a turbine blade with damaged trailing edge which is to be repaired using the method illustrated in FIG. 1.

FIG. 1 shows schematically a method according to one embodiment of the present invention which is used to repair a damaged metallic turbine blade 1. In the present example, a damaged trailing edge region 2 of a turbine blade 1, comprising a suction-side blade wall 3, a pressure-side blade wall 4, a leading edge 5 and a trailing edge 6, is repaired using the method according to the invention as shown in FIG. 2. However, it should be clear that other damaged regions of the turbine blade 1 may be repaired using the method according to the invention, in particular damaged regions of the leading edge 5.

In a first step a), the damaged trailing edge region 2 is removed by forming a cutout 7, illustrated in FIG. 2 as a dotted line. The cutout 7 should be selected sufficiently large to cover, as far as possible, all damage present in the region of the trailing edge 6. In the present case, the cutout 7 is created using a vertical spark erosion process, wherein in principle naturally other material-removal processes are conceivable such as e.g. milling or grinding. During creation of the cutout 7, recesses 9 without undercut relative to the insertion direction 8 are formed on the blade walls 3 and 4, wherein the recesses 9 of the suction-side blade wall 3 are positioned offset to the recesses 9 of the pressure-side blade wall 4 when the turbine blade 1 is viewed from the side according to FIG. 3.

In a step b), a replacement part 10 is then provided which can be inserted by form fit in the cutout created in step a) and is designed to restore the intended geometry of the turbine blade 1. The edge geometry of the replacement part 10 thus corresponds to the edge geometry of the cutout 7. Accordingly, the replacement part 10 has protrusions 11 which can be inserted by form fit in the insertion direction 8 in the recesses 9 of the turbine blade 1 created in step a). The replacement part 10 is produced in particular using an additive manufacturing process. The replacement part 10 is advantageously a standard replacement part with standard dimensions. In this case, the cutout 7 is produced in step a) taking into account the standard dimensions of the standard replacement part.

In a further step c), the replacement part 10 is inserted by form fit in the cutout 7 in the insertion direction 8. The protrusions 11 of the replacement part 10 are here inserted in recesses 9 formed in the blade walls 3 and 4, creating regions in which the replacement part 10 and the turbine blade 1 overlap one another when the turbine blade 1 is viewed from the side, see again the view in FIG. 3. Before performance of step c), the standard replacement part may be machined in order where necessary to minimize any deviations of the geometry of the standard replacement part from the geometry of the cutout 7, for example deviations which have resulted from a distortion of the turbine blade 1 during use in a gas turbine. After insertion in the cutout 7, in step c) the replacement part 10 is furthermore mechanically fixed to the turbine blade 1 using fixing elements 12 extending through the mutually overlapping regions, such that this mechanical fixing blocks any removal of the replacement part 10 from the cutout 7 against the predetermined insertion direction 8. In the present case, the fixing elements 12 are pin-like fixing elements which extend through passage openings 13 formed firstly in the blade walls 3 and 4 and secondly in the protrusions 11 of the replacement part 10. The passage openings 13 of the turbine blade 1 may for example be produced, in particular by boring, during step a) after production of the cutout 7.

Figure 5:
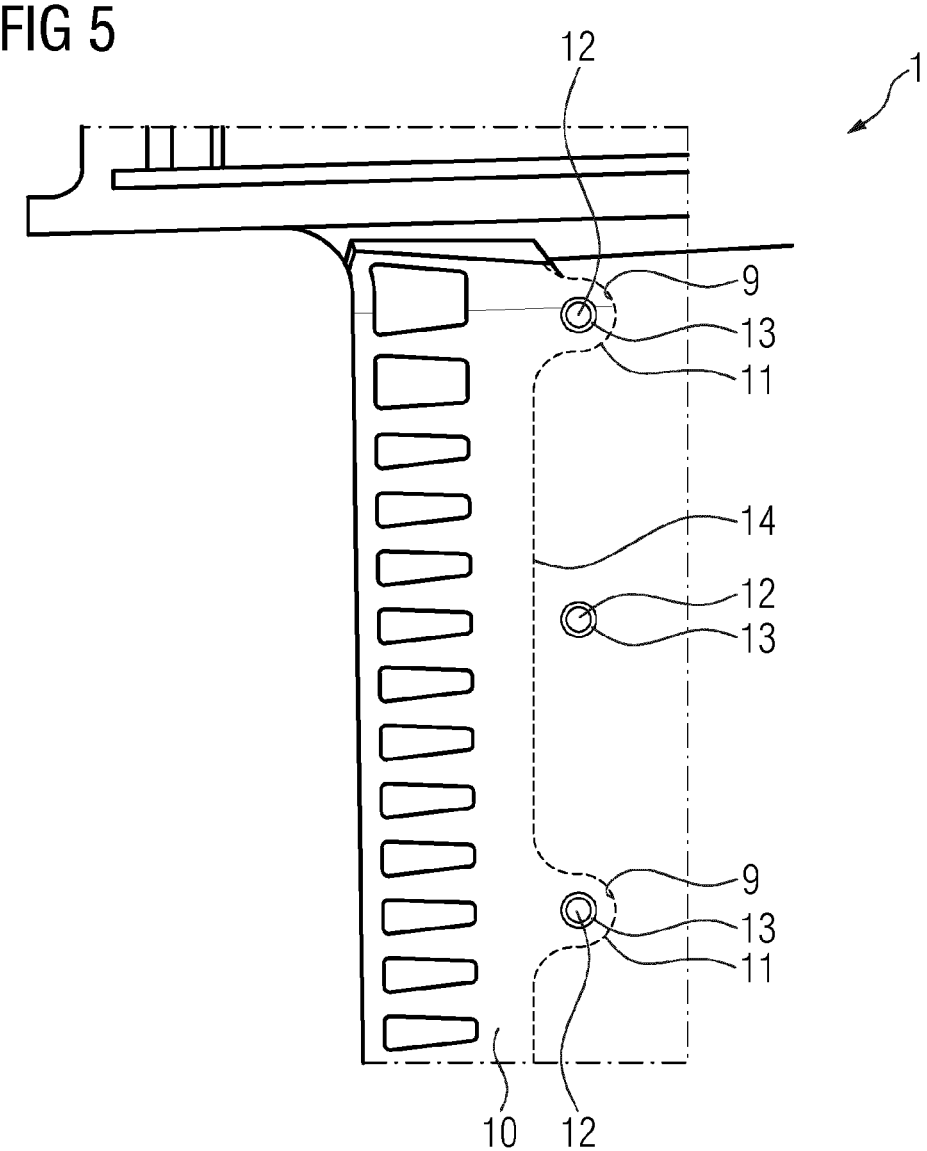
FIG. 5 shows a side view of the arrangement illustrated in FIGS. 3 and 4, in a state in which the replacement part is fixed to the turbine blade.

In a subsequent step d), the replacement part 10 and the turbine blade 1 are connected together along their abutting edges by substance bonding, in the present case using a brazing process. FIG. 5 shows the corresponding connecting seams 14.

Figure 3:
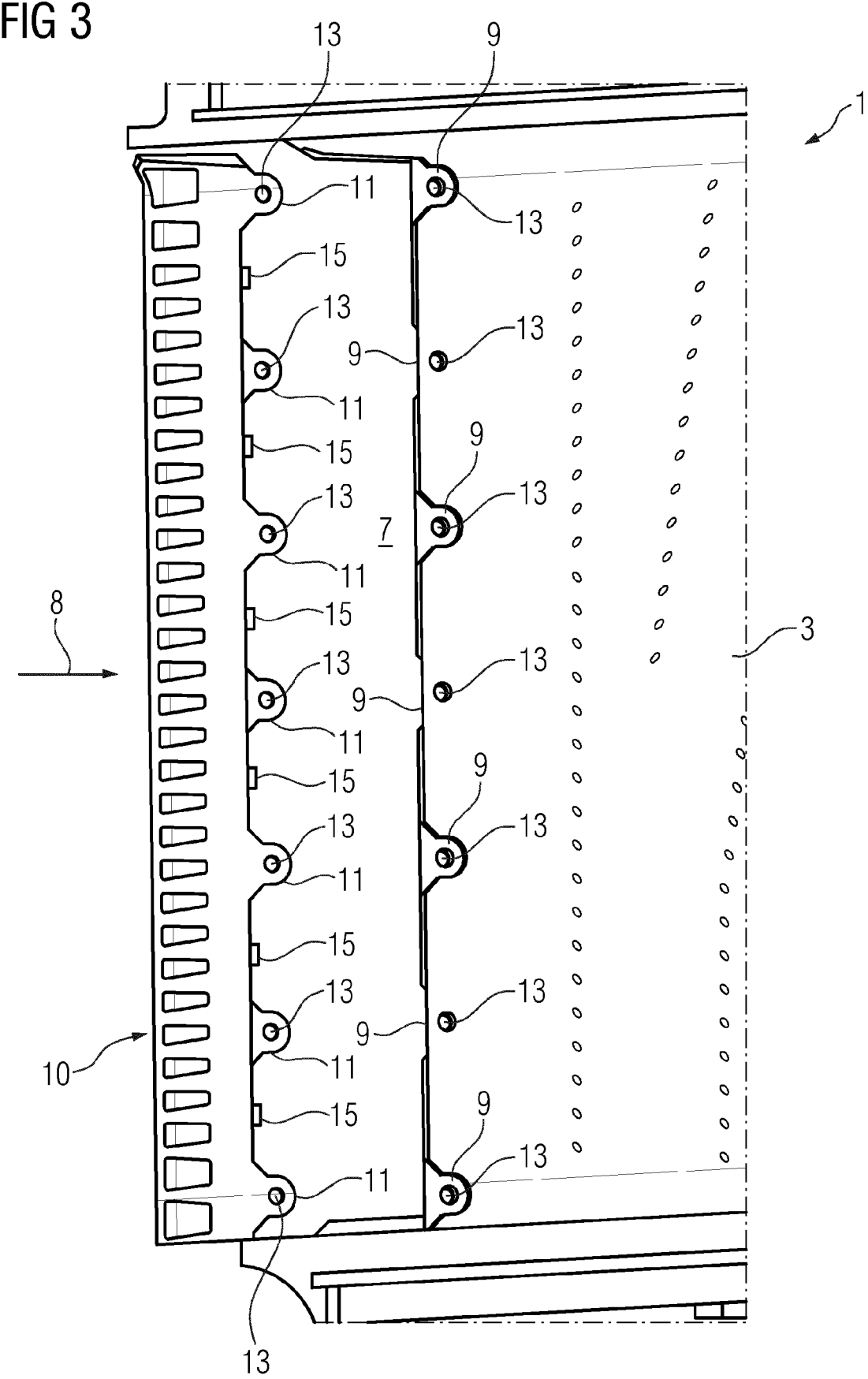
FIG. 3 shows a side view of the turbine blade illustrated in FIG. 2, in which the damaged trailing edge region has been removed by forming a cutout, and a replacement part which can be inserted by form fit in the cutout and restores the intended geometry of the damaged trailing edge.
Figure 4:
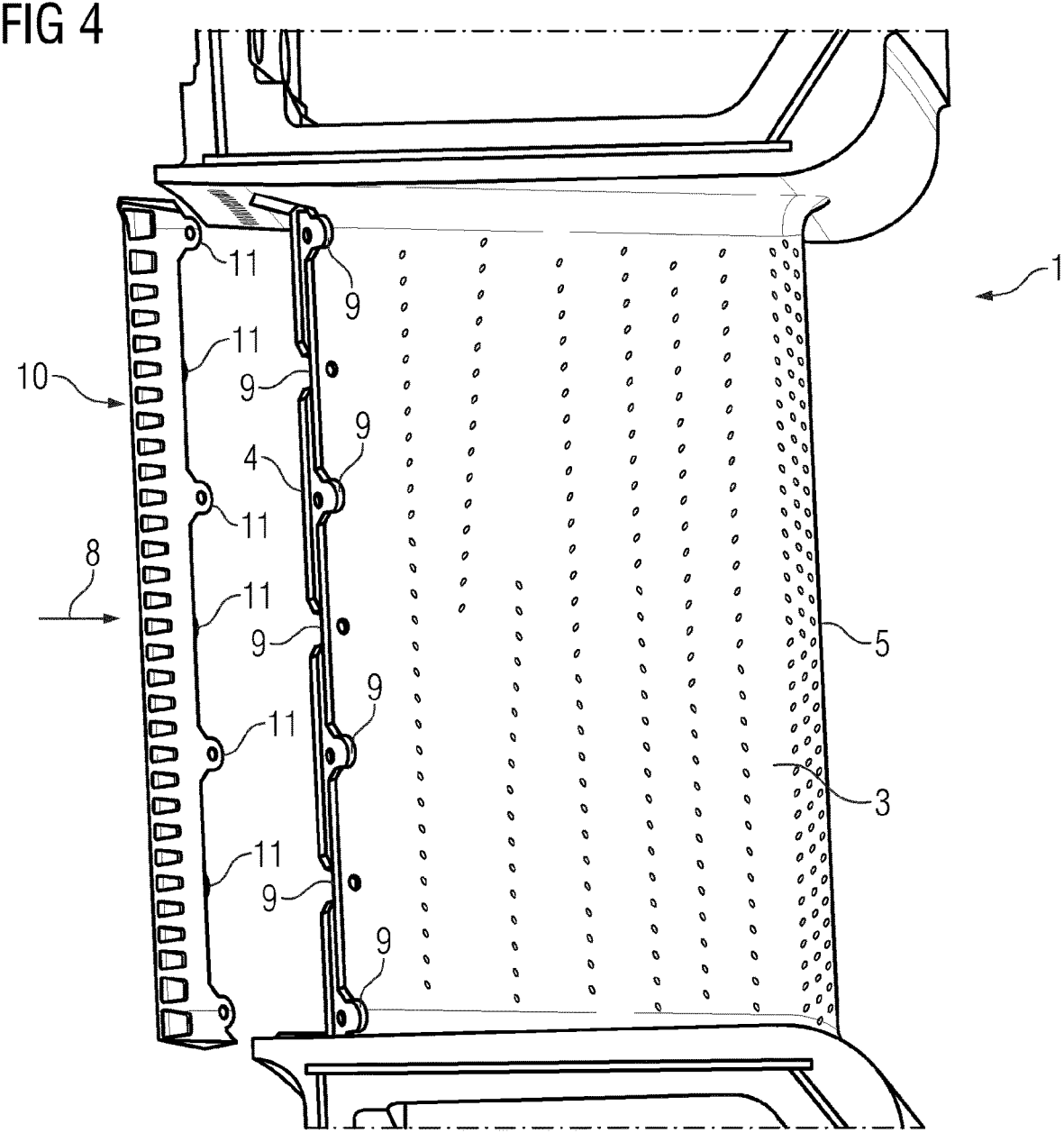
FIG. 4 shows a perspective view of the arrangement shown in FIG. 3.

To optimize the substance-bonded connection, the abutting edges of the replacement part 10 may be provided with spacer protrusions 15, as indicated in FIG. 3, so as to set a predetermined joint width for the substance-bonded connection.

It is pointed out that further method steps may follow the substance-bonded joining, for example for mechanical machining of the connecting seams 14, heat treatment of the repaired turbine blade 1 or similar.

Although the invention has been illustrated and described in detail by the exemplary embodiment, the invention is not restricted by the disclosed examples and other variations may be derived therefrom by the person skilled in the art without leaving the scope of protection of the invention.

The invention claimed is:
1. A method for repairing a damaged leading or trailing edge region of a metallic turbine blade, which has a suction-side blade wall, a pressure-side blade wall and a leading edge and a trailing edge, comprising:
   a) removing the damaged leading or trailing edge region, forming a cutout;
   b) providing a replacement part which can be inserted by form fit into the cutout and which restores an intended geometry of the turbine blade;
   c) inserting the replacement part by form fit into the cutout in a predetermined insertion direction, and d) connecting the replacement part to the turbine blade by substance bonding, wherein in step a), recesses without undercut relative to the insertion direction are formed in the blade walls, wherein the recesses of the suction-side blade wall are positioned offset to the recesses of the pressure-side blade wall when the turbine blade is viewed from the side, wherein the replacement part provided in step b) has protrusions which in step c) are inserted by form fit in the recesses, wherein after insertion of the replacement part, the replacement part and the turbine blade have regions overlapping one another when the turbine blade is viewed from the side, and wherein in step c), after insertion in the cutout, the replacement part is fixed to the turbine blade using fixing elements extending through mutually overlapping regions, such that this mechanical fixing blocks removal of the replacement part from the cutout against the predetermined insertion direction.

2. The method as claimed in claim 1, wherein in step a), the cutout is produced using an erosion process, a vertical spark erosion process, and/or wire spark erosion process.

3. The method as claimed in claim 1, wherein the fixing elements are pin-like and are guided through passage openings provided in the overlapping regions.

4. The method as claimed in claim 1, wherein the replacement part is made by additive manufacturing.

5. The method as claimed in claim 1, wherein the replacement part is a standard replacement part with standard dimensions, and the cutout is produced in step a) taking into account the standard dimensions.

6. The method as claimed in claim 5, wherein the standard replacement part is machined before insertion in step c), so as to minimize deviations of a geometry of the standard replacement part from a geometry of the cutout.

7. The method as claimed in claim 1, wherein abutting edges of the replacement part are provided with spacer protrusions which serve to set a predetermined joint width for a substance-bonded connection.

8. The method as claimed in claim 7, wherein the substance-bonded connection of the replacement part to the turbine blade takes place using a soldering process, and/or using a narrow-gap soldering process.

9. A turbine blade, comprising:

a suction-side blade wall,
a pressure-side blade wall,
a leading edge, and
a trailing edge,
wherein a damaged leading or trailing edge region is repaired using a method as claimed in claim 1.

* * * * *